(12) United States Patent
Yoshikawa et al.

(10) Patent No.: US 7,119,961 B2
(45) Date of Patent: *Oct. 10, 2006

(54) IMAGE PICKUP DEVICE (75) Inventors: Koichi Yoshikawa, Kanagawa (JP); Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 11/078,869

(22) Filed: Mar. 11, 2005

(65) Prior Publication Data
US 2005/0162754 A1 Jul. 28, 2005

Related U.S. Application Data (63) Continuation of application No. 10/399,274, filed on Sep. 15, 2003, now Pat. No. 6,870,680.

(51) Int. Cl.
G02B 27/10 (2006.01)
G02B 13/16 (2006.01)
G11B 7/00 (2006.01)

(52) U.S. Cl. .................. 359/618; 348/335; 369/112.01

(58) Field of Classification Search ................ 359/618, 359/629, 637; 369/112.01, 112.16, 112.17, 369/112.18, 112.19, 112.2; 348/218.1, 335
See application file for complete search history.

(56) References Cited

U.S. PATENT DOCUMENTS 6,141,034 A  10/2000  McCutchen

FOREIGN PATENT DOCUMENTS

| JP | 7-67020 | 3/1995 |
|---|---|---|
| JP | 2001-204015 | 7/2001 |
| JP | 2001-285692 | 10/2001 |
| JP | 2002-229137 | 8/2002 |

*Primary Examiner*—Scott J. Sugarman
*Assistant Examiner*—Darryl J. Collins
(74) *Attorney, Agent, or Firm*—Frommer Lawrence & Haug LLP; William S. Frommer

(57) ABSTRACT

An image pickup device which can obtain an image of wide range picked up by a plurality of cameras is provided by preventing occurrence of parallax.

The image pickup device is constructed such that an object of wide range is divided into a plurality of divided object portions to be separately picked up by a plurality of image pickup elements and images of divided object portions are processed into one combined video image by a processing element to which information on video images supplied from the respective image pickup elements is input; the image pickup element includes a lens 21 and an image pickup element 23 which detects rays of light passed through the lens 21, and when principal rays positioned in a Gauss area are selected from among the principal rays passing through the center of an aperture stop 22 of the lens 21 in the image pickup element and a point where linear components of the selected principal rays in an object side space are extended to intersect an optical axis is defined as an NP point 26, in respective image pickup elements a position of the NP point 26 is set behind the image pickup element 23 and respective NP points of the plurality of image pickup elements are made to congregate within a predetermined radius area in which one NP point 26 is centered.

3 Claims, 8 Drawing Sheets

IMAGE PICKUP DEVICE

This is a continuation of U.S. patent application Ser. No. 10/399,274, filed Sep. 15, 2003 now U.S. Pat. No. 6,870,680, the entirety of which is incorporated herein by reference.

TECHNICAL FIELD

The present invention relates to an image pickup device which can pick up an image of wide range such as of all sky (of all directions).

BACKGROUND ART

Conventionally, there have been developed various kinds of cameras in which a number of video cameras are accommodated in a casing to pick up an image of all directions or of whole circumference simultaneously.

Figure 8:
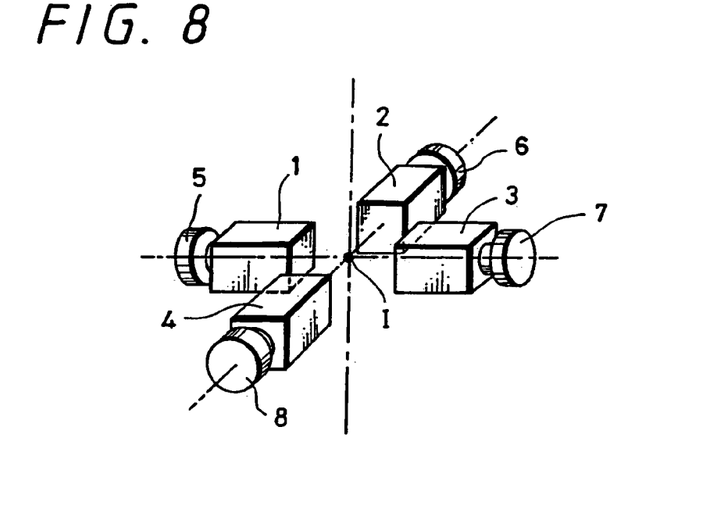
FIG. 8 is a schematic constitutional view showing a conventional image pickup device.
Figure 9:
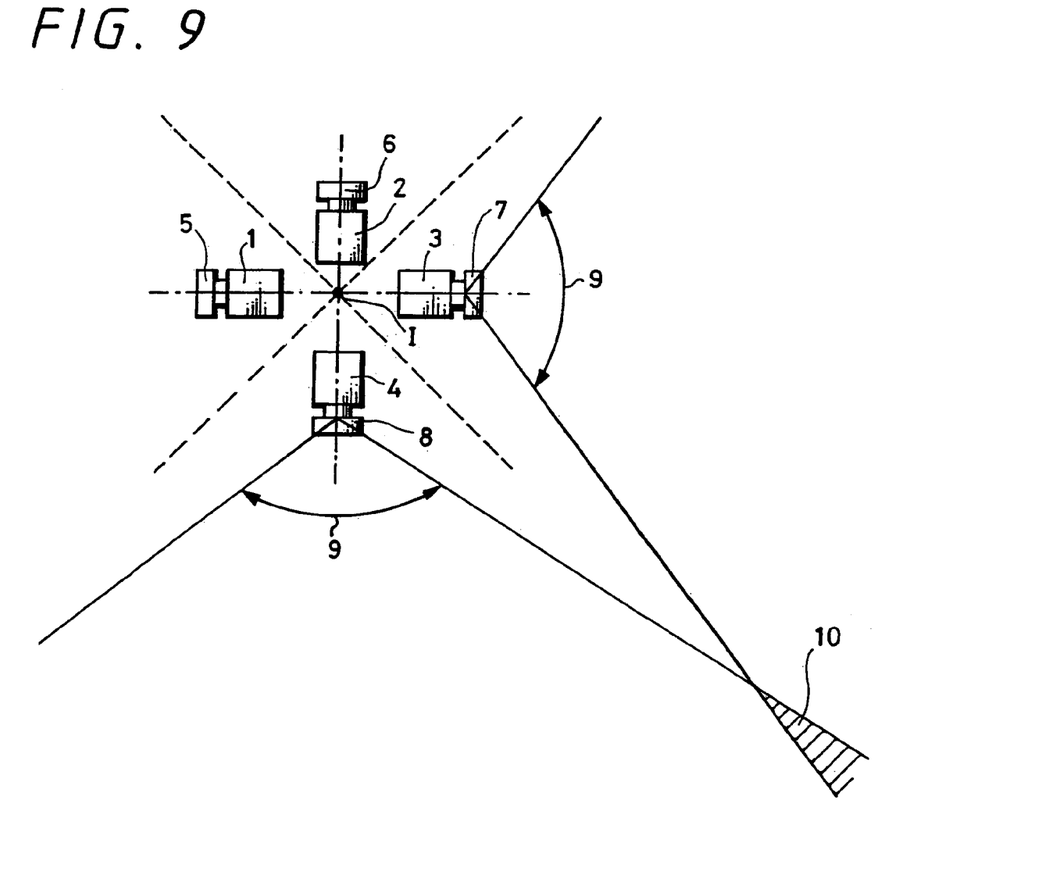
FIG. 9 is a plan view of the image pickup device shown in FIG. 8.

Specifically, for example, in order to obtain an image of wide range such as a panoramic view when a certain point in space is set as a viewpoint and an image of its circumference is picked up on the horizontal plane, as shown, in FIGS. 8 and 9, there are disposed four video cameras 1, 2, 3, and 4 around a point I at equal intervals, in which each optical axis of lenses 5, 6, 7, and 8 of the respective video cameras 1, 2, 3, and 4 is fixed in emitting directions.

An image of 360° can be obtained by the above four cameras 1, 2, 3, and 4 with a portion 10 of each image pickup area 9 being overlapped and then by putting together the overlapped portions.

However, in the above-described conventional image pickup device, each horizontal angle of view of video cameras 1, 2, 3, and 4 is required to be 90° or more, and as shown in FIG. 9, what is called parallax occurs in the portion 10 where the two image pickup areas 9 of video cameras 3, 4 overlap.

Since the value of parallax differs depending on the distance between a camera and an object, when the respective images taken by the cameras 3 and 4 are put together, the obtained image varies according to the reference position determined within the overlapped portion 10.

Specifically, in order that images including parallax are put together for practical use, the reference position is required to be determined according to judgment in which an important part of the image is visually judged by an editor. Accordingly, it has been difficult to combine video images automatically, and which becomes an obstacle to automatic processing of the picked-up image.

In order to solve the above-described problems, according to the present invention, there is provided an image pickup device in which an image of wide range picked-up by a plurality of cameras is obtained by preventing occurrence of the parallax.

DISCLOSURE OF THE INVENTION

An image pickup device according to the present invention is the image pickup device in which an object of wide range is divided into a plurality of divided object portions to be separately picked up by a plurality of image pickup means, and images of divided object portions are processed into one combined video image by processing means to which information on video images supplied from the respective image pickup means is input, wherein the image pickup means includes an image pickup element which detects a lens and rays of light passed through the lens, and when principal rays positioned in a Gauss area are selected from among the principal rays passing through the center of an aperture stop of the lens in the image pickup means and a point where linear components of the selected principal rays in an object side space are extended to intersect an optical axis is defined as an NP point, the NP point is set behind the image pickup element in respective image pickup means and respective NP points of the plurality of image pickup means are made to congregate within a predetermined radius area with one NP point being centered.

According to the above-described construction of the image pickup device of the present invention, since the NP point is set behind the image pickup element in the respective image pickup means, each optical system of the image pickup means does not interfere with light passes of other image pickup means. Further, since each NP point of the plurality of image pickup means is made to congregate within a predetermined radius area, parallax between the respective image pickup means can be eliminated.

BEST MODE FOR CARRYING OUT INVENTION

The present invention is an image pickup device in which an object of wide range is divided into a plurality of divided object portions to be separately picked up by a plurality of image pickup means and images of the divided object portions are processed into one combined video image by processing means to which information on the video images supplied from the respective image pickup means is input, wherein the image pickup means includes an image pickup element which detects a lens and rays of light passed through the lens, and when principal rays positioned in a Gauss area are selected from among the principal rays passing through the center of an aperture stop of the lens in the image pickup means and a point where linear components of the selected principal rays in the object side space are extended to intersect an optical axis is defined as an NP point, the NP point is set behind the image pickup element in respective image pickup means and respective NP points of the plurality of image pickup means are made to congregate within a predetermined radius area with one NP point being centered.

In the above-described image pickup device according to the present invention, a predetermined radius is set to approximately 20 mm with one NP point being centered.

Further, in the above-described image pickup device according to the present invention, in each image pickup means an optical system having a lens and an image pickup element is disposed such that the optical system is included in the space defined by the lines which pass through the NP point and periphery of the lens in each direction.

First, the present invention will be generally described before explaining the specific embodiments thereof.

Figure 1:
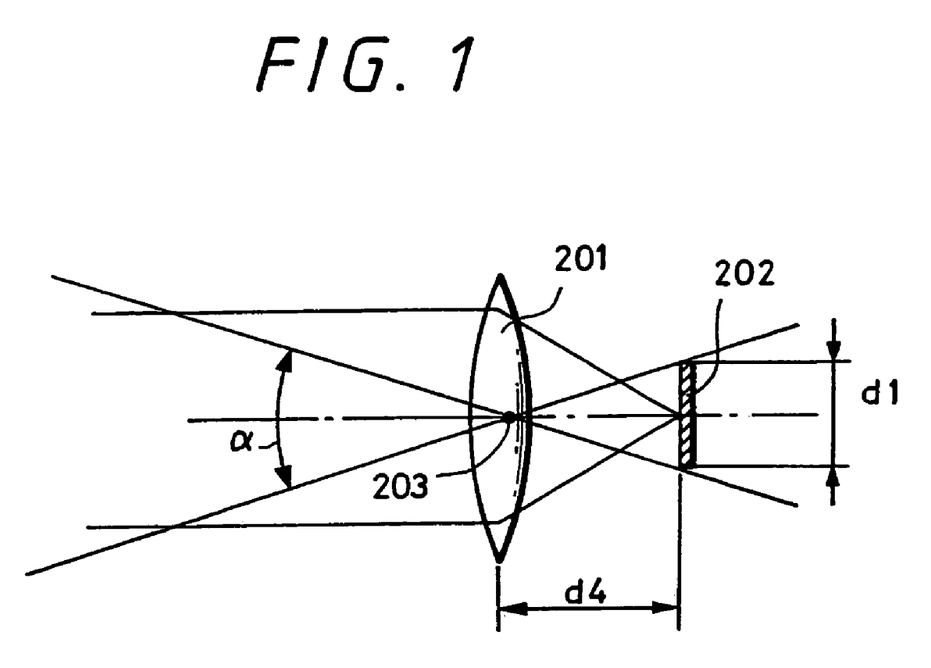
FIG. 1 is a view for explaining a constitutional principle of an image pickup device according to the present invention.

With respect to the design of a lens such as used in video cameras and the like, a plurality of lenses are combined to reduce chromatic aberration, curvature of field and aberration such as flare as much as possible. Basically, such lenses are composed of a thin convex lens 201 as shown in FIG. 1, and at the focal point of the convex lens 201 there is provided a video image pickup device 202 of a solid-state image pickup element such as a CCD, MOS or the like, or a film (202) of image pickup element 202 when a silver salt camera is used.

Then, in the image pickup device having such fundamental structure an angle of view α is defined approximately by a diameter d1 of the image pickup element 202 and a distance d4 between the convex lens 201 and the image pickup element 202 (focal length) when the amount of refraction of the convex lens 201 is disregarded, and the angle of view α is expressed as $\tan(\alpha/2) = (d1/2)/(d4)$.

Accordingly, in the case where an image of an object is picked up using such a camera, if the image is picked up by the camera being rotated on an NP point (non-parallax point) 203 as a central point, which is later described and positioned at the center within the convex lens 201, parallax will not occur between the plurality of obtained images.

Figure 2:
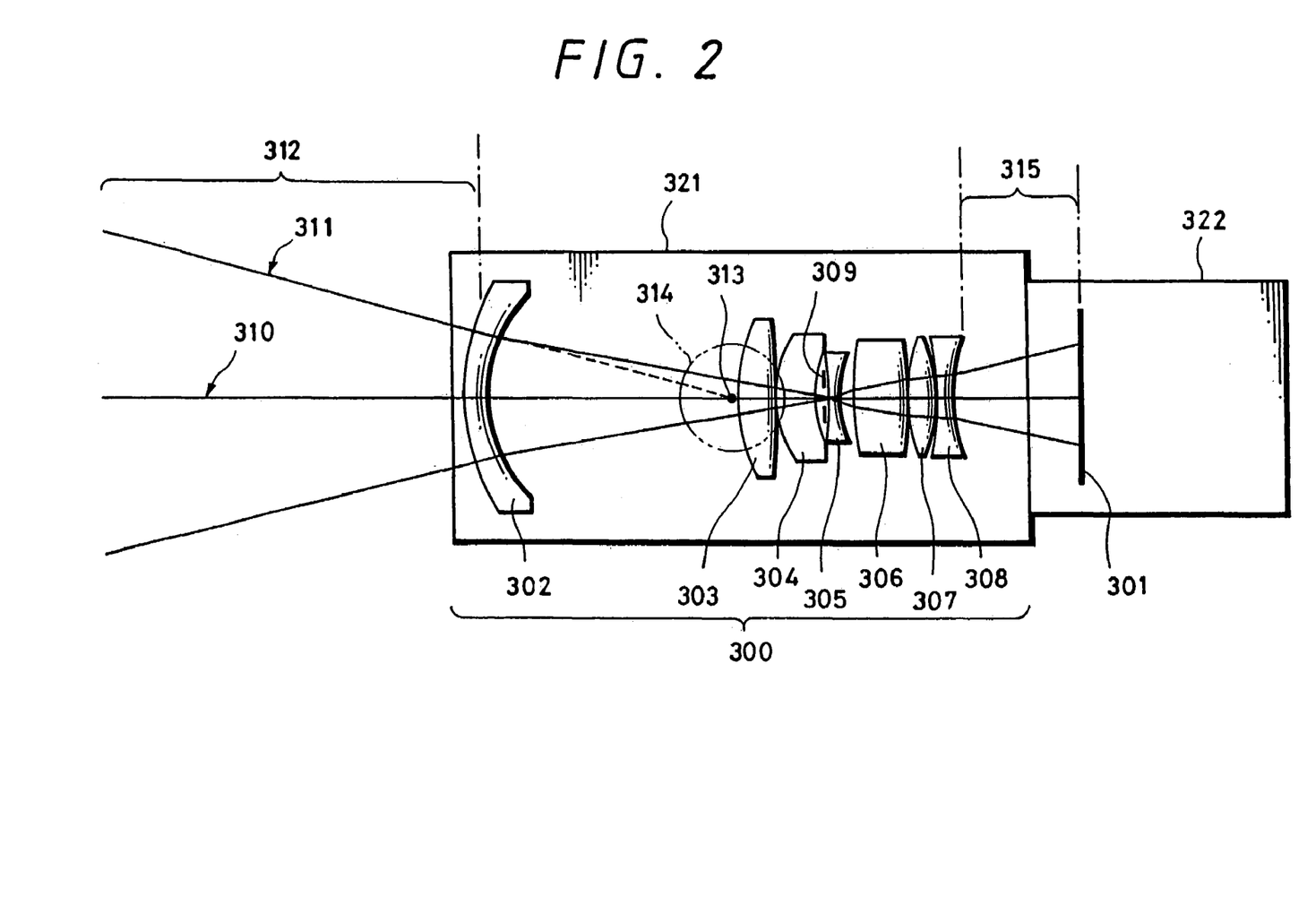
FIG. 2 is a view for explaining the principle of the image pickup device according to the present invention.

Here, it is noted that an NP point was detected as a result of a number of experiments in which, based on the fundamentals of optical systems, inventors of the present invention and others studied how to reduce the parallax occurred when a plurality of images are put together, and hereinafter the NP point will be explained, as shown in FIG. 2, when light reflected on the object focuses into an image on a image pickup unit 301 through an equivalent convex lens 300.

That is, the equivalent convex lens 300 is composed of a plurality of lenses 302 to 308, and an aperture stop 309 is provided between the lenses 304 and 305.

In FIG. 2, numeral 321 indicates a lens body and numeral 322 indicates a camera.

Then, among innumerable principal rays passing through the center of the aperture stop 309, principal rays 311 passing through the area closest to an optical axis 310, that is, the Gauss area where the aberration is smallest are selected.

A point where linear components in the object side space 312 of the selected principal rays 311 are extended to intersect the optical axis 310 is set as an NP point (non-parallax point) 313.

Then, after the existence of the NP point 313 is verified, the present invention is further applied to a case where a plurality of cameras are employed, that is, a plurality of cameras are simultaneously used to pick up an image instead of rotating one camera.

As shown in FIG. 1, when only one convex lens 201 is used, the position of the NP point 203 is limited to a particular point and it is physically impossible to dispose a plurality of cameras whose NP points are common to each other.

On the other hand, it is verified that when a plurality of lenses such as the equivalent convex lens 300 in FIG. 2 are combined, the NP point 313 can be set at an arbitrary position approximately on the extended line of the optical axis 310.

When an image is picked up using a plurality of cameras simultaneously, in order to make respective NP points coincide there is, for example, such construction as positioning the NP point 313 in the air between the plurality of lenses (302 and 303) as shown in FIG. 2, or although not shown in the figure providing a mirror in front of a lens to pick up light reflected on the mirror by a camera and to make a position of virtual image of the NP point of each camera coincide.

However, in either construction, an image pickup element and signal processing circuit in a camera physically become obstacles to prevent picking up an image of all directions.

Figure 3:
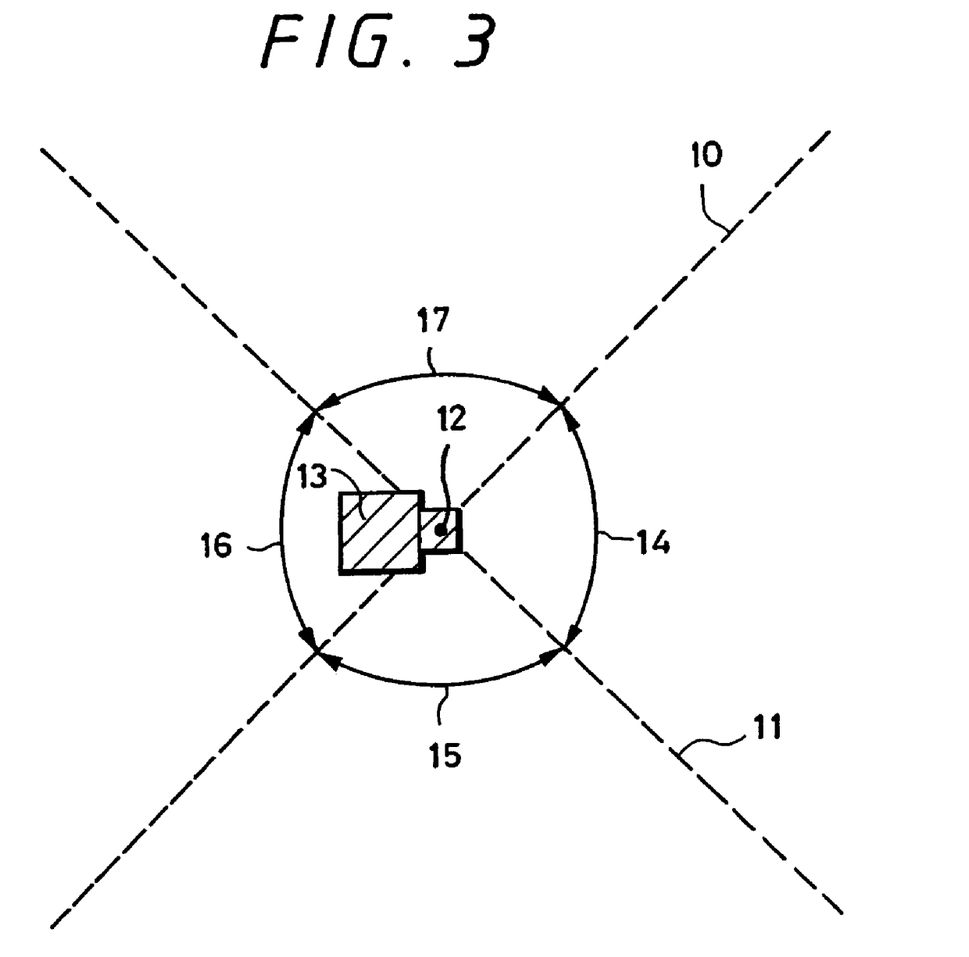
FIG. 3 is a plan view showing an example in which an NP point is in a lens.

That is, when the NP point is within a lens as shown in FIG. 2, it is assumed that NP points 12 of respective cameras are made to coincide at one point as shown in FIG. 3. FIG. 3 shows, for convenience, four angles of view 14, 15, 16, and 17 with respect to four cameras and boundaries 10 and 11 thereof.

In this case, one camera 13 (angle of view 14) which accommodates an image pickup element and a signal processing circuit as shown in FIG. 3 physically interferes with image pickup range of another camera (angle of view 16). Therefore, the interfered portion of the image cannot be obtained and accordingly the image of all directions cannot be obtained.

Although it is possible to lap a camera vertically over other cameras with the optical axes thereof being deviated from each other, an obtained image will be vertically misaligned in this case.

Therefore, according to the present invention, each NP point is disposed behind the image pickup element in respective cameras, and all NP points of the cameras are made to be positioned within a predetermined radius area (spherical area). Accordingly, parallax does not occur between images picked up by the cameras.

Then, in order to set the NP point behind the image pickup element as described above, a plurality of lenses are to be combined to construct an optical system of a telephoto type.

In order to construct the optical system of a telephoto type and to set the NP point behind the image pickup element, for example, a lens having a function of a convex lens (function of convergence) is disposed on the object space side (object side), and a lens having a function of a concave lens (function of divergence) is disposed on the image space side (image pickup element side).

Subsequently, an embodiment of the present invention will be described.

Figure 4:
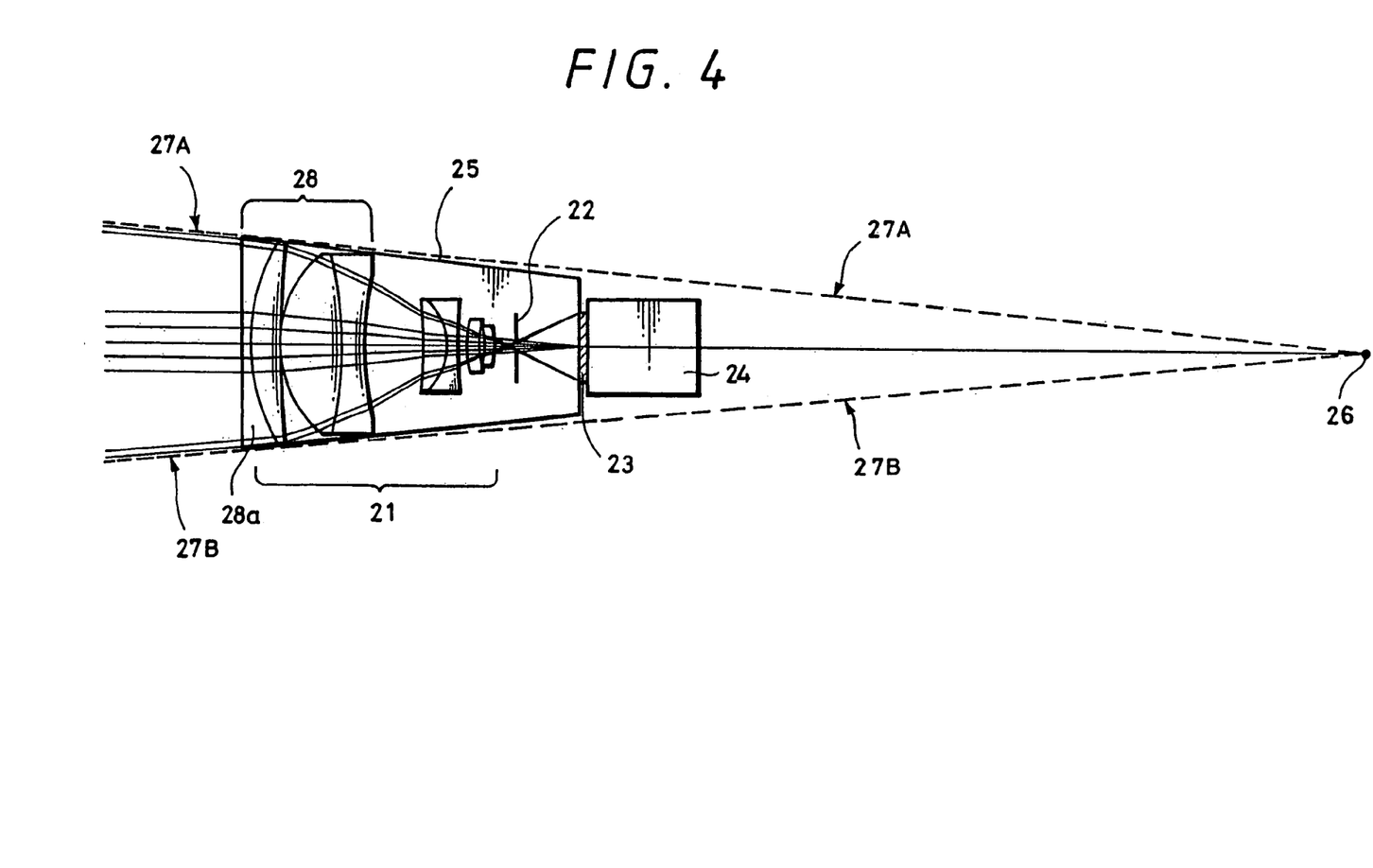
FIG. 4 is a schematic constitutional view showing an image pickup unit constituting the image pickup device according to an embodiment of the present invention.

In FIG. 4, a schematic constitutional view of an image pickup unit constituting the image pickup device is shown as an embodiment of the image pickup device according to the present invention.

The above image pickup unit comprises image pickup compound lens group 21 including a plurality of lenses, an aperture stop 22, an image pickup element 23, and a signal processing unit 24, wherein the image pickup compound lens group 21 and the aperture stop 22 are accommodated in a lens body 25.

Then, in the image pickup compound lens group 21 a front compound lens group 28 on the object space side (object side) has the function of a convex lens (function of convergence) to constitute the above-described telephoto type optical system.

According to the above construction, the NP point 26 can be positioned behind the image pickup element 23.

Further, it is designed that the lens body 25 and the image processing unit 24 are accommodated within the space defined by straight lines 27A and 27B which connect the periphery of a front lens 28a and the NP point 26, thereby enabling a video camera to be placed within the space.

Accordingly, when a plurality of image pickup units shown in FIG. 4 are disposed such that respective NP points 26 are made to approximately coincide, the image pickup element 23 and the signal processing unit 24 become free from interfering with light paths of other cameras, thereby enabling a video image of 360 degrees in all directions including upper and lower, and right and left directions to be picked up without parallax.

Specifically, making the NP points of respective image pickup units approximately coincide is equivalent to setting the NP points of respective image pickup units within a predetermined radius area (spherical area).

In order to put together the images without parallax picked-up by the respective image pickup units, the NP points of respective image pickup units are constructed to be positioned at least within an area (sphere) of a radius of approximately 50 mm, preferably within an area (sphere) of a radius of approximately 20 mm (sphere).

Figure 5:
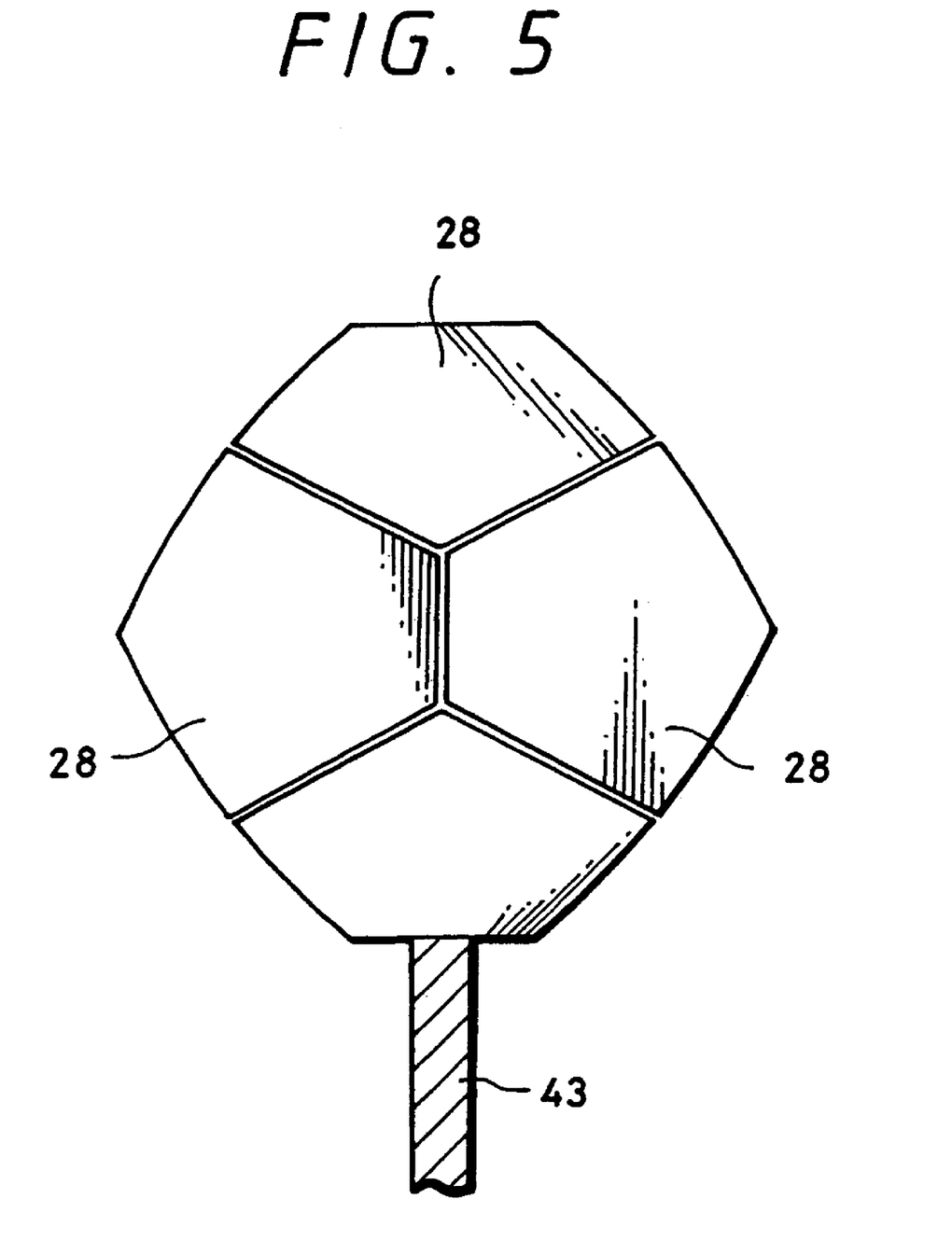
FIG. 5 is a view showing an embodiment of an image pickup device in which a plurality of image pickup units shown in FIG. 4 are disposed.

FIG. 5 shows an embodiment of an image pickup device in which a plurality of image pickup units are disposed such that the position of respective NP points 26 of the image pickup units shown in FIG. 4 approximately coincide.

FIG. 5 shows the image pickup device in which optical systems of a telephoto type including the front lens group 28 whose periphery is pentagonal are assembled into the shape of a regular dodecahedron.

This image pickup device is constructed such that among twelve facets of the regular dodecahedron the bottom facet is used to attach a support 43 or to lead out signal wires of respective cameras (not shown in the figure), and the other eleven facets each include one optical system (refer to FIG. 4), that is, disposing eleven optical systems in total.

It is obvious from this construction that disposing optical systems on a polyhedron enables a camera system which picks up an image of approximately all the celestial sphere to be obtained.

With respect to the polyhedron, it is not limited to the regular dodecahedron shown in FIG. 5 and it may be a regular hexahedron (cube) or a regular icosahedron.

Further, although with respect to the polyhedron it is easy to design a regular polyhedron, it is not necessary to be the regular polyhedron depending on the design of an optical system.

According to the construction of the above-described embodiment, since a plurality of NP points 26 are made to coincide approximately, parallax of an image picked-up by each image pickup unit is eliminated.

Further, since the plurality of image pickup units are provided, it is possible to pick up an image of wide range such as an image of approximately all directions according to the construction shown in FIG. 5.

Consequently, it becomes possible to pick up an image of all directions without parallax.

Furthermore, since an image is picked up by a plurality of image pickup units after dividing the image pickup range, picking-up an image by each camera at high resolution enables the image of wide range to be picked up at high resolution.

Figure 6:
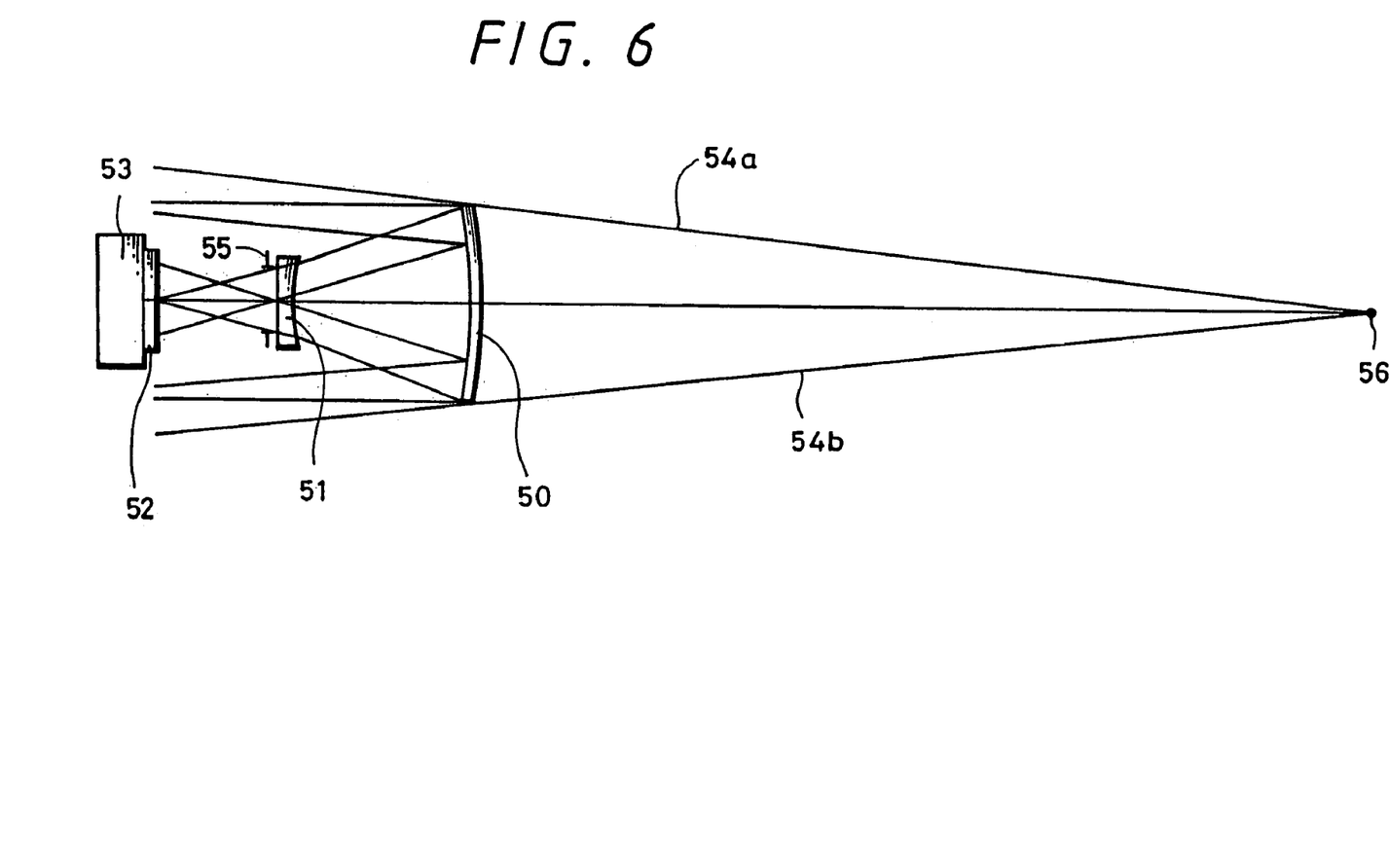
FIG. 6 is a schematic constitutional view showing an image pickup unit constituting an image pickup device according to another embodiment of the present invention.

In FIG. 6, a schematic constitutional view of an image pickup unit constituting the image pickup device is shown as another embodiment of the image pickup device according to the present invention.

The above image pickup unit comprises a concave mirror 50, a concave lens 51, an aperture stop 55, an image pickup element 52, and a signal processing unit 53.

Then, light from the outside is reflected on the concave mirror 50 to enter the concave lens 51.

According to the construction of the above image pickup unit, since the light from the outside is reflected and converged by the concave mirror 50, the concave mirror 50 has a function of a convex lens (function of convergence). Therefore, with the concave mirror 50 and another optical-system including the concave lens 51 an optical system of a telephoto type is constructed, and an NP point 56 is made to be positioned behind the concave mirror 50.

In this construction, the space occupied by one image pickup device is the space defined by connecting the peripheries of the concave mirror 50 and the NP point 56, that is, within the straight lines 54a and 54b.

Then, when a plurality of image pickup units shown in FIG. 6 are disposed such that the respective NP points 56 are made to approximately coincide, the image pickup element 52 and the signal processing unit 53 become free from interfering with light paths of other cameras, thereby enabling a video image of 360 degrees in all directions including upper and lower, and right and left directions to be picked up without parallax.

Figure 7:
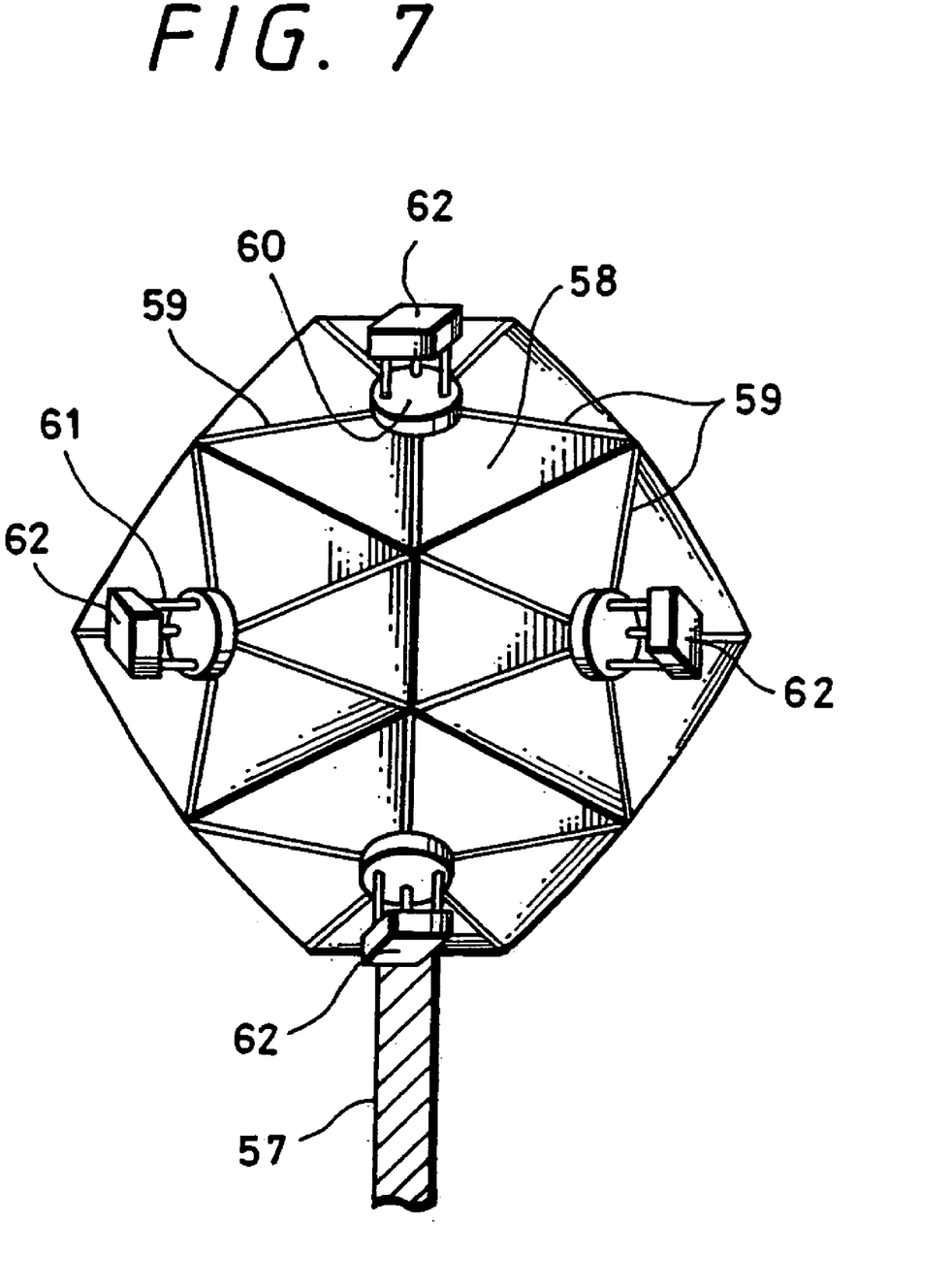
FIG. 7 is a view showing an embodiment of an image pickup device in which a plurality of image pickup units shown in FIG. 6 are disposed.

FIG. 7 shows an embodiment of the image pickup device in which a plurality of image pickup units shown in FIG. 6 are disposed such that the respective NP points approximately coincide.

FIG. 7 shows the image pickup device in which optical systems of a telephoto type having a concave mirror 58 of an equilateral pentagon and refractive optical-system 60 (lens) are assembled into the shape of a regular dodecahedron.

This image pickup device is constructed such that among twelve facets of this regular dodecahedron the bottom facet is used to attach a support 57 or to lead out signal wires of respective cameras (not shown in the figure), and the other eleven facets each include one optical system (refer to FIG. 6), that is, disposing eleven optical system in total. In FIG. 7, a numeral 59 represents stays which support the refractive optical-system 60 and a numeral 61 represents stays which support the video cameras 62.

It is obvious from this construction that disposing optical systems on a polyhedron enables a camera system which picks up an image of approximately all the celestial sphere to be obtained.

With respect to the polyhedron, it is not limited to the regular dodecahedron shown in FIG. 7, and it may be a regular hexahedron (cube) or a regular icosahedron.

Further, although with respect to a polyhedron it is easy to design a regular polyhedron, it is not necessary to be the regular polyhedron depending on the design of an optical system.

According to the above-described embodiment, similarly to the previous embodiment, since a plurality of NP points 56 are made to coincide approximately, parallax of an image picked-up by each image pickup unit is eliminated and further it is possible to pick up an image of wide range such as an image of all directions according to the construction shown in FIG. 7.

Consequently, it becomes possible to pick up an image of all directions without parallax.

Furthermore, since an image is picked up by a plurality of image pickup units after dividing the image pickup range, picking-up an image by each camera at high resolution enables the image of wide range to be picked up at high resolution.

Furthermore, in this embodiment, since the image pickup elements 52 and the signal processing units 53 are disposed on the outside of the polyhedron instead of being provided inside the polyhedron, constraint on dimensions of the polyhedron is mitigated, thereby enabling the polyhedron to be smaller sized.

Although in the above-described embodiments the respective image pickup units, whose NP points are made to approximately coincide, constitute a polyhedron to pick up an all-sky image, the present invention can be applied to other constructions.

For example, the present invention may be applied to a construction in which a part of, for example, the front half of all celestial sphere is picked up by a plurality of image pickup units whose NP points approximately coincide. Further, it may be possible to combine another image pickup unit having a different NP point to pick up an image of other directions than those of the front half.

Further, for example, the present invention may be applied to a construction in which respective image pickup units are disposed on a horizontal plane to pick up a strip-shaped image of 360 degrees in horizontal direction.

The present invention is not limited to the embodiments described above, and can take various modifications without departing from the gist of the present invention.

According to the above-described embodiments, parallax between respective image pickup units is eliminated and light paths of other image pickup units are not interfered.

Accordingly, an image of wide range, such as an image of all directions can be picked up.

Further, since an image is picked up by a plurality of lenses and cameras after dividing the image pickup area, picking-up an image by each camera at high resolution enables the image of wide range to be picked up at high resolution.

What is claimed is:

1. An image pickup device in which an object of wide range is divided into a plurality of divided object portions to be separately picked up by a plurality of image pickup means and images of the divided object portions are processed into one combined video image by processing means to which information on video images supplied from said respective image pickup means is input characterized in that:

said image pickup means comprises a lens and an image pickup element which detects rays of light passed through said lens, and when from among principal rays passing through the center of an aperture stop of said lens in said image pickup means the principal rays positioned in Gauss area are selected and a point where linear components of said selected principal rays in an object side space are extended to intersect an optical axis is defined as an NP point, in said respective image pickup means, said NP point is set behind said image pickup element and respective NP points of said plurality of image pickup means are made to congregate within a predetermined radius area in which one NP point is centered, wherein said respective image pickup means are disposed on a horizontal plane to pick up a strip-shaped image of 360 degrees in horizontal direction.

2. An image pickup device according to claim 1, wherein said predetermined radius is set to approximately 20 mm with one NP point being centered.

3. An image pickup device according to claim 1, wherein in said respective image pickup means an optical system having said lens and said image pickup element is disposed within a space defined by straight lines passing through said NP point and the periphery in each direction of said lens.

* * * * *